United States Patent [19]
Sachs et al.

[11] 3,748,745
[45] July 31, 1973

[54] DYESTUFF MANUFACTURE

[75] Inventors: George Sachs; Anthony Kenneth Dunn; William Frederick Skuce, all of Manchester, England

[73] Assignee: Imperial Chemical Industries Limited, London, England

[22] Filed: Nov. 29, 1971

[21] Appl. No.: 203,045

[52] U.S. Cl. ..................................................... 34/10
[51] Int. Cl. ............................................. F26b 3/08
[58] Field of Search ..................................... 34/8, 10

[56] References Cited
UNITED STATES PATENTS
2,130,154    9/1938    Riley .................................... 34/8 X
3,271,194    9/1966    Oikawa ................................. 34/8 X Primary Examiner—John J. Camby
Attorney—Cushman, Darby & Cushman

[57] ABSTRACT

A process for the isolation of an edible water-soluble azo dyestuff, comprising subjecting an aqueous solution or suspension of the dyestuff to atomisation by delivery of the solution or suspension on to a high speed rotating disc, in the presence of a stream of gas which is chemically inert towards the dyestuff and which is heated to a temperature in the range 200°–400° C.

The products are particularly suitable for dry mixing into powdered foodstuff materials.

1 Claim, No Drawings

DYESTUFF MANUFACTURE

This invention relates to the manufacture of certain edible water-soluble dyestuffs, more particularly to a process for the isolation of such dyestuffs by a spray drying technique whereby products having improved dry dispersibility in foodstuff preparations may be obtained.

It is already known to isolate water soluble azo dyestuffs from an aqueous solution or slurry, formed at an intermediate stage in their manufacture, by means of spray drying, whereby a product in the form of dry, free-flowing granules is obtained. Certain water-soluble azo dyestuffs are of particular interest for colouring foodstuff preparations, such as cornflour and sugar, and it is common practice to incorporate these edible dyestuffs in the powdered foodstuffs by a dry mixing procedure. For this purpose it is highly desirable that the dyestuff should be in such a form that it readily disperses into the foodstuff during the dry mixing process to give a homogeneous product substantially free from specks of colour. Dyestuffs having this desirable property are commonly obtained by means of a dry grinding process, but such products have a tendency to agglomerate. Water-soluble dyestuffs prepared in free-flowing, granular form by a spray drying technique do not normally give speck-free dispersions by dry mixing. A particular spray drying process has now been found, however, whereby this disadvantage may be overcome or very substantially minimised in the case of certain specified edible dyestuffs, and a product obtained which has a free-flowing, granular form and yet is at least equivalent in dry dispersibility to dry ground material.

According to the present invention there is provided a process for the isolation of an edible water-soluble azo dyestuff as hereinafter defined, comprising subjecting an aqueous solution or suspension of the dyestuff to atomisation by delivery of the solution or suspension on to a high speed rotating disc, in the presence of a stream of gas which is chemically inert towards the dyestuff and which is heated to a temperature in the range 200°–400° C.

Edible water-soluble azo dyestuffs which may be isolated by means of the process of the invention are those having the following chemical constitutions :

the trisodium salt of 1 - (4-sulpho-1-naphthylazo)-2-naphthol - 3,6-disulphonic acid (C.I. Food Red 9)

the trisodium salt of 3-carboxy-5-hydroxy-1-p-sulphophenyl-4-p-sulphophenylazopyrazole (C.I. Food Yellow 4)

the disodium salt of 1-p-sulphophenylazo-2-naphthol-6-sulphonic acid (C.I. Food Yellow 3)

the disodium salt of 2-(4 sulpho-1-naphthylazo)-1-naphthol-4-sulphonic acid (C.I. Food Red 3)

the trisodium salt of 1-(4-sulpho-1-naphthylazo)-2-naphthol-6,8-disulphonic acid (C.I. Food Red 7)

the product of coupling diazotised naphthionic acid with a mixture of maclurin (C.I. 75240) and morin (C.I.75660) (C.I. Food Brown 2).

The process of the invention may be performed in respect of any of the foregoing dyestuffs with the aid of a conventional commercial spray dryer of the rotating disc type (as distinct from the nozzle type dryer). The aqueous solution or suspension of the dyestuff which is to be atomised is prepared by mixing the dyestuff with an appropriate amount of water. The dyestuff may be initially in either the dry condition as, for example, when obtained from a preparation in which it has been isolated and dried by other means, or in the wet condition as, for example, when in the form of a wet filter cake. Preferably the amount of water employed is such as to yield a slurry in which the dyestuff is present partly in solution and partly in suspension. In most cases the amount of water so required will comprise between 50 percent and 70 percent of weight of the total solution or suspension; preferably the amount of water will lie in the range 60–70 percent by weight. The solids content of the aqueous solution or suspension will consist predominantly of the dyestuff to be isolated, but other inert solid materials, such as sodium chloride, may be present in minor amounts.

The aqueous solution or suspension may be delivered on to the rotating disc dryer at substantially normal temperature, that is to say, in the region of 20°–25° C. If desired, however, the drying process may be assisted by bringing the solution or suspension before delivery on to the rotating disc to a moderately elevated temperature, for example a temperature in the range 80°–110° C.

The stream of heated gas into which the aqueous solution or dispersion is atomised may consist of any gas or mixture of gases which is inert towards the dyestuff being dried, for example air, carbon dioxide or nitrogen. For reasons of economy and convenience, air is preferred. The inert gas is caused to enter the spray dryer at a temperature in the range 200°–400° C; the temperature of the gas on leaving the dryer will normally lie in the range 90°–170° C. Preferably the dryer is operated with a gas inlet temperature of 300°–350°C., and an outlet temperature of 120°–140° C. The precise selection of temperature conditions will however, depend upon the moisture content which it is desired to achieve in the final product. Usually the moisture content will be less than 10 percent of the weight of the dried dyestuff.

The speed at which the rotating disc of the spray dryer is rotated during the performance of the process of the invention will depend upon the disc diameter. In the case of a disc of diameter 8¼ inches, the speed of rotation preferably lies between 7,000 and 15,000 r.p.m.

The dried dyestuff may be collected after atomisation in the conventional manner, that is to say in part by utilizing the effect of gravity which causes the larger dried particles to fall to the base of the spray dryer chamber, and in part by separation of the finer particles from the exit stream of inert gas, for example by means of a cyclone separator.

Edible water-soluble dyestuffs isolated by the process of the invention possess to a surprising degree the property of ready dispersibility on dry mixing into powdered foodstuff materials, such as cornflour and sugar, to yield speck-free products which are of value for the preparation of "instant" beverage mixes, confections and the like. This property is possessed particularly by the "fines" fraction of the dried material which is separated from the exit gases from the spray dryer, but is nevertheless evident to a marked degree in the coarser particles which collect in the dryer under the influence of gravity.

The invention is illustrated but not limited by the following Example, in which parts are by weight.

EXAMPLE

The water-wet edible dyestuff known as C.I. Food Yellow 4, produced as a filter cake from a filtration stage in its manufacture, i mixed is water to make a slurry containing 69 parts of water and 31 parts of dyestuff of which about one part is salt, and at ambient temperature this slurry is delivered at such a rate to the rotating disc atomiser of a spray dryer, with the disc of 8¼ ins. diameter rotating at 8000 revolutions per minute and with the dryer receiving air at 350°C, that the air leaving the dryer is at 130° C. The dried dyestuff is collected partly as free flowing non-dusty granules in the main dryer chamber and partly as fine particles in the dryer cyclone, about 30 percent by weight being collected in the cyclone.

A mixture "A," representing the total product from the dryer, is made by blending 70 percent by weight of the granular product from the dryer chamber with 30 percent by weight of the fine product from the dryer cyclone.

This mixture "A," a portion "B" of the fine product obtained from the dryer cyclone, and the fraction "C" of this fine product which passes a 200 mesh B.S. sieve are compared for dry dispersibility with a sample "D" of a very finely ground dyestuff (C.I. Food Yellow 4) manufactured especially for use in admixture with finely ground dry foodstuffs, in the following way:

One part of dry dyestuff is shaken for 5 minutes by hand with 100 parts of dry cornflour and a small quantity of this mixture is placed on a piece of paper. The paper is folded and pressed by hand to leave a smooth bed of the mixture when the paper is unfolded. A small drop of water is placed on the bed of mixture which is then observed for the development of colour specks.

The speckiness shown by the mixture "A" is no greater than that shown by the finely ground dyestuff "D" although the former contains particles having diameters in the range 10 – 180 micrometres, with the bulk of its mass in the range 120–180 micrometres, whereas the latter contains loose agglomerates of particles having diameters in the range 1–30 micrometres, with the bulk of its mass in the range 10–25 micrometres. The fine product "B" from the dryer cyclone, which contains particles having diameters in the range 10–90 micrometres, with the bulk of its mass in the range 40–60 micrometres, shows slightly fewer specks than either the mixture "A" or the finely ground dyestuff "D." The sieved fraction "C" of this product which contains particles in the range 10 –60 micrometres, with the bulk of its mass in the range 40 – 60 micrometres, shows still fewer specks. All of the spray dried materials are free-flowing products.

It is of course to be understood that any of the edible water-soluble azo dyestuffs specifically mentioned herein may be isolated by the method described in the above Example.

We claim:

1. A method for producing a dry, free-flowing edible water-soluble azo dyestuff which is readily dispersible on dry mixing into powdered foodstuff materials to provide a homogeneous product substantially free from specks of color, said azo dyestuff being selected from the group consisting of CI Food Yellow 3, CI Food Yellow 4, CI Food Red 3, CI Food Red 7, CI Food Red 9 and CI Food Brown 2, comprising providing an aqueous solution or suspension of said dyestuff, said solution or suspension containing 50–70 weight percent water, delivering said solution or suspension to a high speed rotating disc dryer wherein the speed of the surface of said disc dryer corresponds to the speed of the surface of a disc dryer having a diameter of 8¼ inches and a rotational speed of 7000–15000 rpm in the presence of a stream of gas which is chemically inert towards said dyestuff to atomize said dyestuff, said gas being heated to a temperature in the range of 200°–400° C, separately collecting a first fraction of relatively coarse dyestuff particles and a second fraction of fine dyestuff particles and admixing said first and second fractions to provide said dry, free-flowing water-soluble azo dyestuff, the resulting admixture containing particles of dyestuff having diameters in the range of about 10–180 micrometers with the bulk of said particles having a diameter in the range of about 120–180 micrometers.

* * * * *